Feb. 11, 1930.  C. BREER  1,746,336
FILTER ATTACHMENT FOR GASOLINE SYSTEMS
Filed Feb. 26, 1926
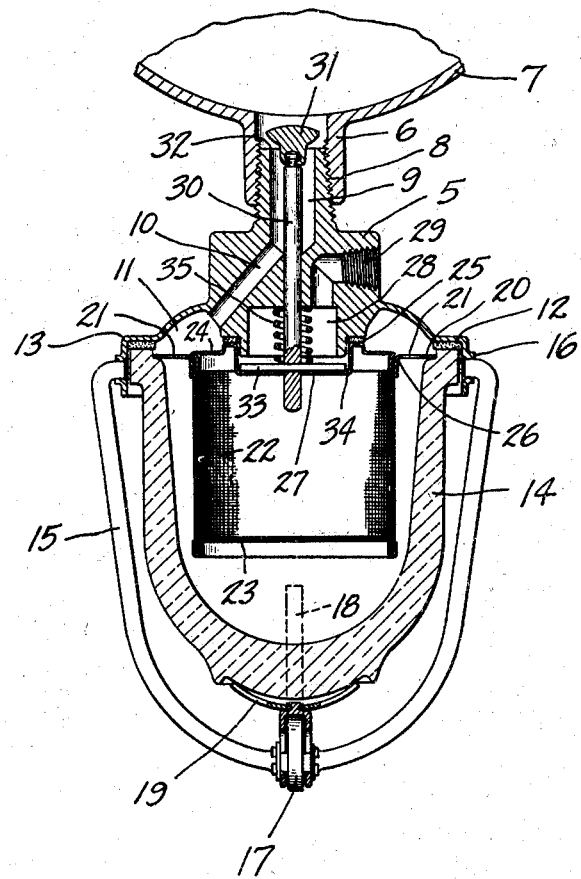
Inventor
CARL BREER
By Jhnig Harness
Attorney Patented Feb. 11, 1930

1,746,336

UNITED STATES PATENT OFFICE

CARL BREER, OF DETROIT, MICHIGAN, ASSIGNOR TO CHRYSLER CORPORATION, OF DETROIT, MICHIGAN, A CORPORATION OF DELAWARE

FILTER ATTACHMENT FOR GASOLINE SYSTEMS

Application filed February 26, 1926. Serial No. 90,954.

It has become customary, in some constructions, to dispose a bowl containing a filter element under the vacuum tank used on automobiles, through which bowl and filter all of the gasoline passing from the vacuum tank to the carburetor of the automobile must pass. The purpose of this, of course, is to filter the gasoline passing to the internal combustion engine, and the bowl and filter are removed at intervals for cleansing purposes.

It is a primary object of my invention to provide with such a device, a valve connected with the vacuum tank or other device to which the bowl and filter are attached, which valve will positively close when the bowl and filter are removed and will automatically open when the bowl and filter are positioned in their normal places.

With the above and other objects in view my invention consists in the arrangement, combination and construction of the various parts of my improved device, as described in the specification, claimed in my claims, and shown in the accompanying drawing, in which:

The figure is a central sectional view showing my improved device in assembled position.

I have shown a fitting 5 screwed in a member 6 of a vacuum tank 7 as at 8. The fitting 5 is provided with a central aperture 9 and an aperture 10 connecting therewith and leading to the passage or chamber 11 in the bottom of the fitting 5.

A gasket 12 is seated against the bottom of the portion 13 of the fitting 5 and a bowl 14 is clamped against the gasket 12 by means of a hoop 15 pivoted as at 16 and having a cam 17 at its bottom, operated by a handle 18 against the member 19 on the bottom of the bowl. Thus, by turning the cam 17 through the handle 18, the hoop 15 may be swung clear of the bowl and the bowl removed.

Positioned within the bowl 14 is a plate-like member 20 having openings 21 therein through which gasoline in the chamber 11 may pass into the bottom of the bowl. A filter consisting of a screen 22 to which is attached a bottom 23 and a top 24 is positioned in the bowl 14, being held in place by wedging the top 24 between the gasket 25 and the edge 26 of the plate-like member 20. The top 24 of the filter is provided with a central aperture 27 through which gasoline may pass into the aperture 28 in the fitting 5 and through the aperture 29 in the fitting 5, to a carburetor or other suitable receptacle.

The above construction is more or less conventional for the purpose of filtering gasoline and forms no particular part of my invention, except in combination with the valve to be hereafter described.

Extending through the passage 9 is a stem 30 having a head 31 adapted to seat as at 32 on the end of the passage 9 so as to close the same. The stem 30 extends through the fitting 5 into the opening 28, through the opening 27 and into the filter proper. A pin 33 is provided in the stem 30 seating on the flange 34 around the opening 27. A coiled spring 35 is positioned around the stem 30 bearing at its bottom against the pin 33 and at its top against the fitting 5 at the top of the opening 28.

It will thus be seen that when the bowl 14 and the filter are removed, the flange 34 against which the pin 33 rests will likewise be removed and the spring 35 will cause the stem 30 and its head 31 to move downwardly so that the head 31 will seat at 32 and prevent further passage of gasoline from the tank 7.

After the bowl and filter have been cleaned and are again assembled in the position shown in the drawing, the act of assembling will bring the pin 33 to bear on the flange 34 and raise the stem 30 and its head 31 so as to open the valve and permit the normal flow of gasoline from the tank.

It will be obvious that various changes may be made in the arrangement, combination and construction of the various parts of my improved device, without departing from the spirit of my invention and it is my intenton to cover by my claims such changes as may be reasonably included within the scope thereof.

What I claim is:

1. In combination, a liquid fuel receptacle, a fitting connected therewith having a passage leading from the receptacle, a chamber removably secured to the fitting, a filter in the chamber and removable therewith, an outlet passage connected with the filter, a valve seat in the first passage, a valve in the first passage, a piece forming a top for the filter, a stem on the valve extending through the top of the filter, a pin extending through the stem and adapted to bear on the top of the filter when the latter is in place to hold the valve off its seat and a spring bearing on the pin to move the stem and bring the valve to its seat when the filter is removed.

2. In combination, a liquid fuel receptacle, a fitting connected therewith having a passage leading from the receptacle, a chamber removably secured to the fitting, a filter in the chamber and removable therewith, an outlet passage in the fitting connected with the filter, a valve seat and valve in the first passage, a stem on the valve, a top piece for the filter, means connecting said top piece with the stem to hold the valve off its seat when the filter is in assembled position and means for returning the valve to its seat when the filter is removed.

3. Liquid handling means comprising a body with a passage-way having an opening intermediate its ends, a cup detachably mounted over said opening to seal the same, a cover for said cup, a filter attached to said cover and housed in said cup, a valve in said passage-way on the inlet side of said cup, means normally closing said valve, and means engaged by said cover for holding said valve open when said cup and cover are in place.

CARL BREER.